T. M. KLUSEWITZ.
CUTLERY SHARPENER.
APPLICATION FILED MAY 14, 1913.
1,075,110.
Patented Oct. 7, 1913.
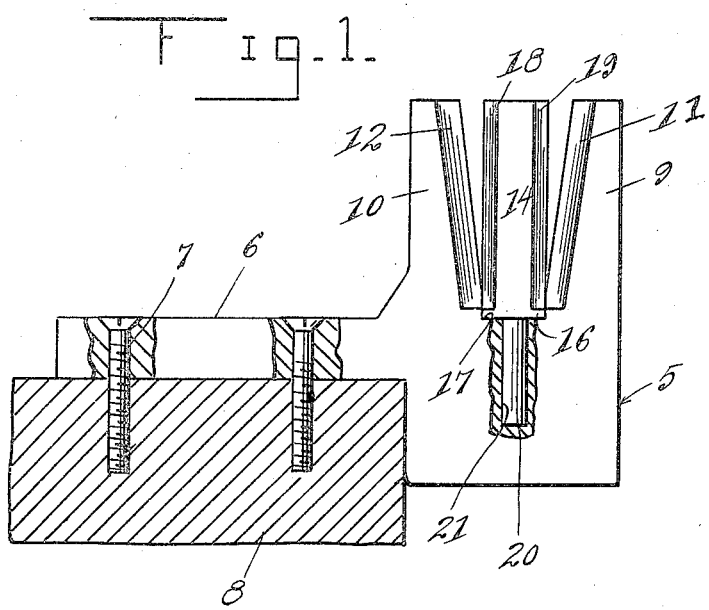
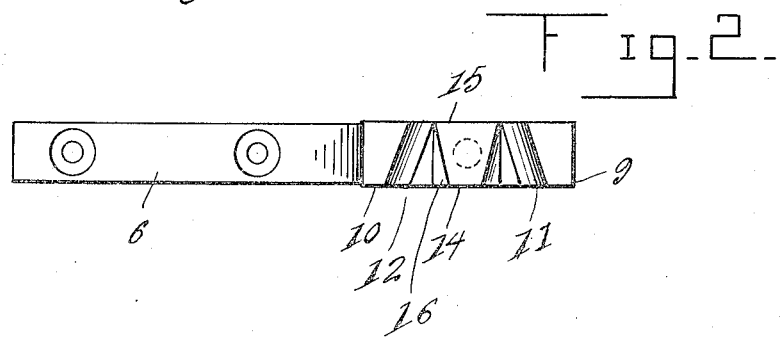
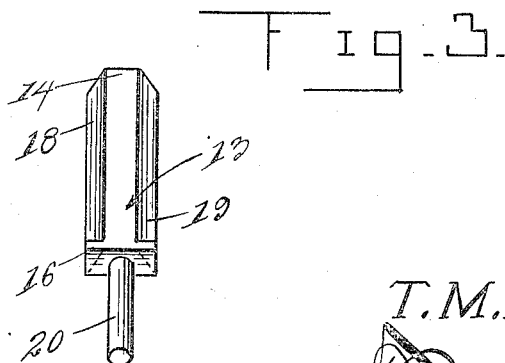
Witnesses
CR Bealle.
R. M. Smith.
Inventor
T. M. Klusewitz.
By
Attorney

UNITED STATES PATENT OFFICE.

THOMAS M. KLUSEWITZ, OF BALTIMORE, MARYLAND.

CUTLERY-SHARPENER.

1,075,110.  Specification of Letters Patent.  Patented Oct. 7, 1913.

Application filed May 14, 1913. Serial No. 767,736.

*To all whom it may concern:*

Be it known that I, THOMAS M. KLUSE-WITZ, a citizen of the United States, residing at Baltimore, in the State of Maryland, have invented certain new and useful Improvements in Cutlery-Sharpeners; and I do hereby declare the following to be a full, clear, and exact description of the invention, such as will enable others skilled in the art to which it appertains to make and use the same.

This invention comprehends improvements in cutlery sharpeners and has for one of its objects the provision of a device of this nature, which shall be of extremely simple construction, cheap to manufacture, and very efficient.

Another object of the invention is to provide a sharpener comprising a body or frame having an attaching arm formed integrally therewith, and a sharpening or cutting element secured between the arms or forks formed by recesses in said frame.

The invention also aims to generally improve sharpeners of this nature to render them more useful, practical, and commercially desirable.

With these and other objects in view, as will become more apparent as the description proceeds, the invention consists in certain novel features of construction, combination, and arrangement of parts, as will be hereinafter described and claimed.

For a complete understanding of my invention, reference is to be had to the following description and accompanying drawings, in which, Figure 1 is a front elevation of my sharpener, showing the same partly broken away, Fig. 2 is a top plan view, and, Fig. 3 is a perspective view of the sharpening element.

Referring in detail to the drawings by numerals, 5 designates, generally, the body of my improved sharpener, and 6 a supporting arm formed integrally with one edge thereof and extending laterally therefrom. The arm is provided with openings to receive fastening members, such as the screws 7, whereby the device may be rigidly secured to any suitable support, such as indicated by the numeral 8. The body and arm may be formed of any suitable material, such as cast or malleable iron, and the former is in the shape of a rectangular plate, which is formed with a central recess opening upon its upper edge and forming the arms or forks 9 and 10. The outer edges of the forks are parallel and form part of the vertical edges of the body, and the inner edges 11 and 12 diverge outwardly and are beveled in opposite directions. The beveled faces 11 and 12 cause the rear faces of the arms to be of a greater width than the forward faces.

A cutting bar or sharpening element of hardened tool steel, generally designated 13, is disposed between the arms 9 and 10 and has its front and rear faces 14 and 15 disposed in the planes of the front and rear sides of the body 5. The cutting bar is formed with a rectangular base 16 which seats within the correspondingly shaped recess 17 and prevents the bar from turning. The side edges 18 and 19 of the cutting bar are beveled forwardly, above the base 16, as clearly shown in Figs. 1 and 2. A circular stem or shank 20 is formed upon the base of the cutting bar and is received within an opening 21 formed in the body 5. When the stem 20 is driven into the opening 21, the cutting bar is firmly secured in operative position.

When a knife is drawn in between the faces 12 and 18, its cutting edge is sharpened on one side by coming in contact with the cutting bar 13. The other side of the cutting edge is sharpened by drawing the knife between the faces 11 and 19. It will be noted that the V-shaped openings formed on each side of the cutting member permit the knife to be held so as to cause the cutting member to properly act thereon.

From the foregoing description taken in connection with the accompanying drawings, it will be seen that I have provided an extremely strong and simple sharpener which may be rigidly secured in position, and which may be manufactured so as to sell at a relatively low price.

Having thus described my invention, what I claim is:—

A sharpening device of the character described, comprising a rectangular body having a centrally positioned recess opening upon its upper edge and providing spaced arms, the opposed edges of said arms being beveled in opposite directions and diverging outwardly, a sharpening bar having a longitudinally projecting stem formed on its inner end, the body being provided with a longitudinal opening to receive said stem, said bar having a rectangular base and having its side edges beveled in opposite directions above said base, the body being recessed to receive the base.

In testimony whereof I affix my signature in presence of two witnesses.

THOMAS M. KLUSEWITZ.

Witnesses:
ROMAN WEGSVCKI.
JAN SCHRATOWSKY.

Copies of this patent may be obtained for five cents each, by addressing the "Commissioner of Patents, Washington, D. C."